United States Patent
Courtney

(10) Patent No.: US 7,352,564 B2
(45) Date of Patent: Apr. 1, 2008

(54) POWER DISTRIBUTION SUBSTATION

(75) Inventor: Thomas A. Courtney, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 439 days.

(21) Appl. No.: 10/966,332

(22) Filed: Oct. 16, 2004

(65) Prior Publication Data

US 2006/0085097 A1 Apr. 20, 2006

(51) Int. Cl.
*H02B 1/26* (2006.01)
*H02B 5/00* (2006.01)

(52) U.S. Cl. ............ 361/622; 361/600; 361/601; 361/603; 361/620

(58) Field of Classification Search ........ 361/600–601, 361/603, 620, 622
See application file for complete search history.

(56) References Cited

U.S. PATENT DOCUMENTS 1,966,218 A * 7/1934 Powers .................. 361/607
4,504,885 A * 3/1985 Yoshikawa et al. ......... 361/614
6,233,137 B1 * 5/2001 Kolos et al. ................ 361/603
2006/0181837 A1 * 8/2006 Sun et al. ................... 361/602

* cited by examiner

*Primary Examiner*—Jayprakash Gandhi
*Assistant Examiner*—Zachary M Pape
(74) *Attorney, Agent, or Firm*—Martin J. Moran

(57) ABSTRACT

An improved power distribution unit substation, having a plurality of differing voltage rated main breaker cells, encased within a single housing is disclosed. The improved power distribution substation saves considerable floor space as compared to prior art substations. One embodiment houses a plurality of main breaker cells in a single housing. In this embodiment, a low voltage main breaker cell is vertically positioned above a plurality of medium voltage main breaker cells. Alternatively, a medium voltage main breaker cell is vertically positioned above a plurality of low or medium voltage cells. Improved single-ended and double-ended power distribution substations are disclosed that offer cost and floor space savings as compared to prior art substations.

3 Claims, 8 Drawing Sheets

POWER DISTRIBUTION SUBSTATION

BACKGROUND

1. Field of the Invention

This invention generally relates to the distribution of electrical power in a network, and more specifically to power distribution substations (commonly referred to as "unit substations") adapted to receive electrical power at a first voltage and distribute power to a network at a different voltage.

2. Related Art

Electrical power control and distribution systems are commonplace in modern electrical distribution systems. A unit substation is a power distribution substation, which generally receives electrical power at a higher voltage, and distributes power to a network at a lower voltage, such as, for example, in a network used in a hospital or other facility. A unit substation typically consists of three physically and electrically connected components, comprising a primary protective or isolation device, a substation transformer, and secondary distribution equipment.

Several United States-recognized standards address design requirements for components of the power distribution substation industry. These standards include, for example, Circuit Breaker specifications, such as the National Electrical Manufacturers Association (NEMA) Standard SG-3, ANSI Standards C37.13, C37.16, C37.17, and Underwriter's Laboratories (UL) specifications UL 1066 and 489. These standards also include switchgear standards, such as, for example, NEMA Standard SG5, Canadian Standards Association (CSA), ANSI 37.20.1, C37.20.2, C37.20.3, C37.51, and UL Standard 1558 and 891. Each of the standards noted above are incorporated by reference herein for their teachings on power distribution equipment design.

One disadvantage of prior art unit substations is associated with the amount of floor space occupied by the substation. As noted above, one typical application of a unit substation is for use in a building, wherein the substation typically occupies a large area of floor space required by the substation footprint. The floor space occupied by unit substations can become burdensome to a building space planner or building owner.

Another disadvantage associated with unit substations is related to errors arising from substation installation "coordination" activities. Generally, there are at least three distribution substation components that must be carefully coordinated and installed correctly, otherwise errors result. For example, in the traditional distribution substation, the primary protective device is physically separated from the secondary distribution equipment by the substation transformer. The conduits and cables must fit precisely into poured concrete in a building floor, for example, which are custom-designed in accordance with the precise substation dimensions. The dimensional location of the primary conduit and cable, in relation to the secondary distribution equipment, is based upon the physical width dimensions of the substation transformer, which is located between the primary and secondary equipment. If the dimension of the substation transformer changes after the initial dimensions of the concrete slab have been established, the location of the primary conduit must be changed accordingly. This imposes severe cost and time constraints on the substation installation. The present invention overcomes this problem.

Therefore, there is a need for an improved power distribution substation that provides a reduced substation footprint, reduces the number of components required to operate each substation, and eases the installation tasks associated therewith, thereby reducing errors associated with coordination activities, such as, for example, the pouring of concrete, and the installation of support channels and conduits.

The improved unit substation overcomes the disadvantages noted above while reducing overall costs to the power distribution substation customer.

SUMMARY

An improved power distribution substation is described enclosing a plurality of vertically stacked switchgear main breaker cells in a single housing. In one embodiment, a low-voltage switchgear main breaker cell, adapted to distribute electrical power at low voltage, is encased within the same enclosure as a medium voltage switchgear main breaker cell, and is adapted to protect and switch a primary connection to a distribution transformer. In this embodiment, the low and medium-voltage main breaker cells are vertically arranged within the same enclosure.

More specifically, in one embodiment, a low voltage switchgear main breaker cell, and associated instruments and electrical components, are enclosed in an upper encasement, and a medium voltage main breaker cell, and associated instruments and electrical components, are enclosed in a lower encasement cell within a single power distribution substation housing. The upper and lower encasements are electrically isolated from one another using an isolating barrier, which may, in some embodiments, comprise open space, or an electrically insulating material, or metal material.

In one embodiment, the isolation barrier inhibits electrical arcing between the upper and lower voltage main breaker cells. In this embodiment, the isolation barrier inhibits heat from flowing between the main breaker cells.

In one embodiment, the upper encasement includes a control power transformer ("CPT"). In this embodiment, the CPT is powered by the medium voltage main breaker cell via power distribution lines that are coupled to components encased within the lower encasement.

In one embodiment, redundant power distribution is provided using an improved power distribution substation. In this embodiment, a plurality of medium voltage main breaker cells are electrically common on their load sides and coupled to the primary side of a transformer. Power is continuously provided to the transformer primary, even if one of the medium voltage main breaker cells or supply lines fails.

In one embodiment, a plurality of main breaker cells is vertically arranged within a single encasement. In some embodiments, a low voltage main breaker cell is vertically positioned above a medium-voltage main breaker cell, all within a single encasement. In other embodiments, a medium voltage main breaker cell is vertically positioned above a low-voltage main breaker cell, all within a single encasement.

BRIEF DESCRIPTION OF THE DRAWINGS

Embodiments of the present invention will be more readily understood by reference to the following figures, in which like reference numbers and designations indicate like elements.

DETAILED DESCRIPTION

An improved power distribution substation (also referred to herein as a unit substation) is described. The improved substation encases a plurality of switchgear main breaker cells within a single enclosure. The improved substation provides a floor space savings as compared with prior art substations. Heretofore, medium voltage and low voltage circuit breakers required independent housings. In contrast, the present improved substation allows several different voltage cells (such as low and medium voltage cells) to be housed within the same enclosure. This results in cost and floor space savings as compared to the prior art substations. Because the present improved power distribution substation provides different types of voltage rated main breaker cells in a single structure, the use of multiple structures providing differently voltage rated main breaker cells is eliminated. Hence, overall costs are reduced through use of the improved substation, by providing the equivalent of multiple differently rated substations in a single substation enclosure. Additionally, substation installation is eased because the substation installer has one less enclosure to coordinate and install. In one embodiment, one main breaker cell has a different voltage rating with respect to the other main circuit breaker. This invention further provides advantages should the situation arise after installation where the transformer must be replaced. By eliminating the enclosure on the medium-voltage side of the transformer, transformer replacement is facilitated.

Figure 1A:
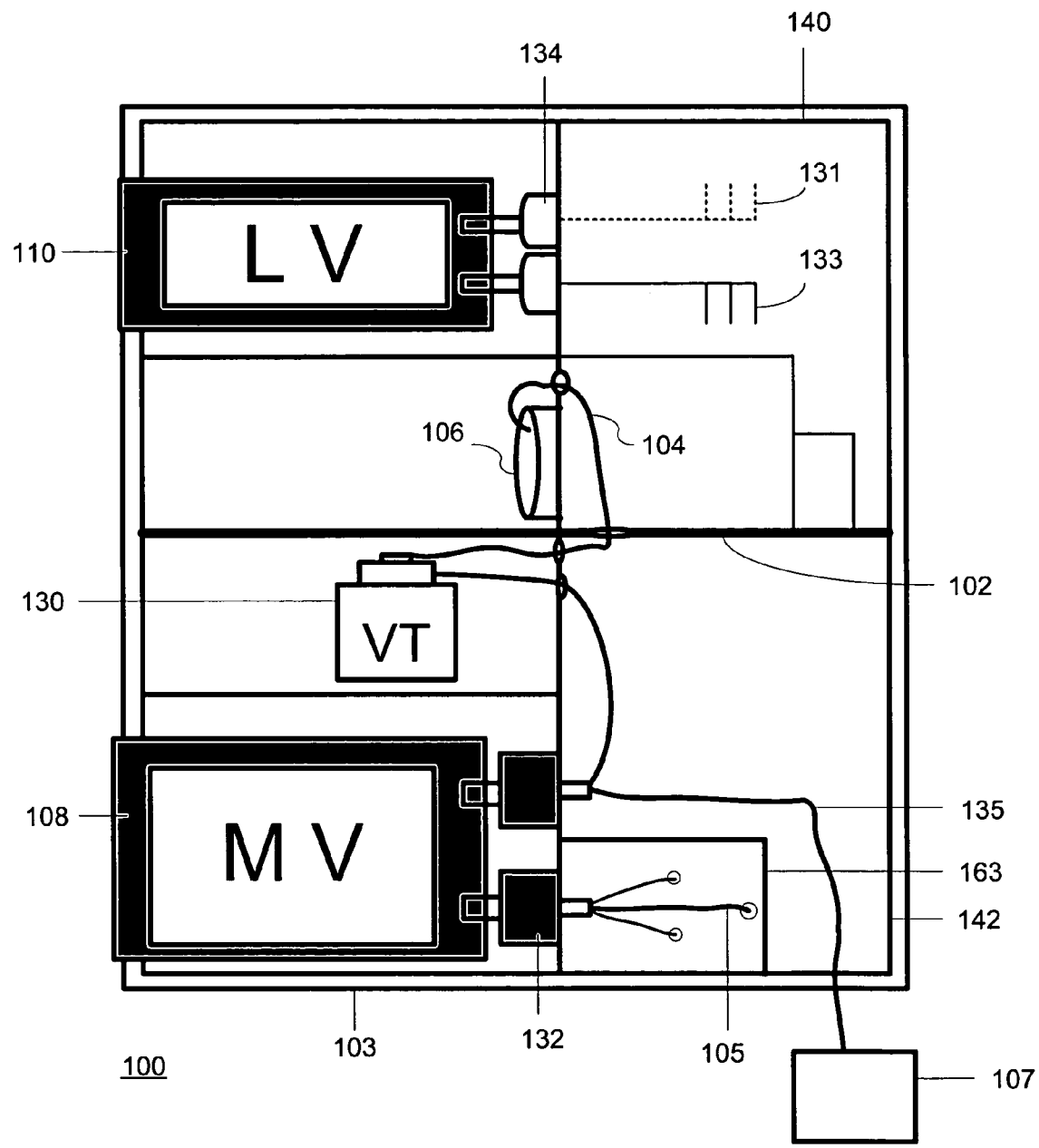
FIG. 1a illustrates a cut away side view of an exemplary embodiment of an improved unit substation, wherein the substation houses a medium voltage and a low voltage main breaker cell, arranged vertically with respect to each other, and all within a single encasement.

FIG. 1a shows a cut away view of an improved power distribution substation 100. A first voltage main breaker cell 110 and a second voltage main breaker cell 108 are at least partially enclosed within the substation housing 103, which are adapted to distribute a first voltage and a second voltage, respectively, to an electrical power distribution network (not shown). In one embodiment, the first cell 110 comprises a low voltage main breaker cell, which distributes low voltage power to the power distribution network. In this embodiment, the second cell 108 comprises a medium voltage main breaker cell, which connects medium voltage power to the substation transformer primary windings (not shown), via a medium voltage power line 105.

In the exemplary embodiment, the low voltage main breaker cell 110 is housed in an upper encasement 140, and the medium voltage main breaker cell 108 is housed in a lower encasement 142. The upper encasement 140 includes additional associated instruments and electrical components therein, of the sort well known in the art, including, for example, a control power transformer (CPT) 106, and runbacks 134 (which function to connect the low voltage main breaker cell 110 to a bus 133, which provides a connection to distribution breakers). Although FIG. 1a does not illustrate a substation transformer, bus connection 131 (protruding into the page), connects to a secondary side of the transformer providing a voltage pathway from the low voltage main breaker cell 110. Similarly, the lower encasement 142 includes additional associated instruments and electrical components therein, of the sort well known in the art, including a voltage transformer 130 and contacts 132 (which function to connect the breaker cell 108 to a bus (not shown)). Power is provided to the improved substation via a utility provider 107, through a power line 135.

In this embodiment, an isolating barrier 102 is located between the upper and lower encasements 140, 142. The isolating barrier 102 may be constructed of many different types of materials, including, for example, steel, aluminum, micarta (glass polyester), or Formex, which function to prevent/inhibit electrical arcing between the encasements 140, 142. It is possible that composite materials composed of the aforementioned materials may also be used to construct the barrier 102. Additionally, the barrier 102 may comprise open space. The open space may provide a physical separation between the main breaker cells 108 and 110 in order to accommodate certain ANSI specifications for heat rise and impulse withstand, or Basic Impulse Level (BIL). In one embodiment, an isolation barrier 163 provides electrical isolation between incoming and outgoing cables.

In some embodiments, the barrier 102 is adapted to prevent and/or inhibit heat from being transferred between the upper encasement 140 and the lower encasement 142. In these embodiments, various means are available to control heat transfer, such as, for example, providing a predetermined amount of open space between the encasements 140 and 142. Other means of controlling heat transfer include use of convection, forcing air flow (e.g., using fans), and/or using heat sinks.

Figure 1B:
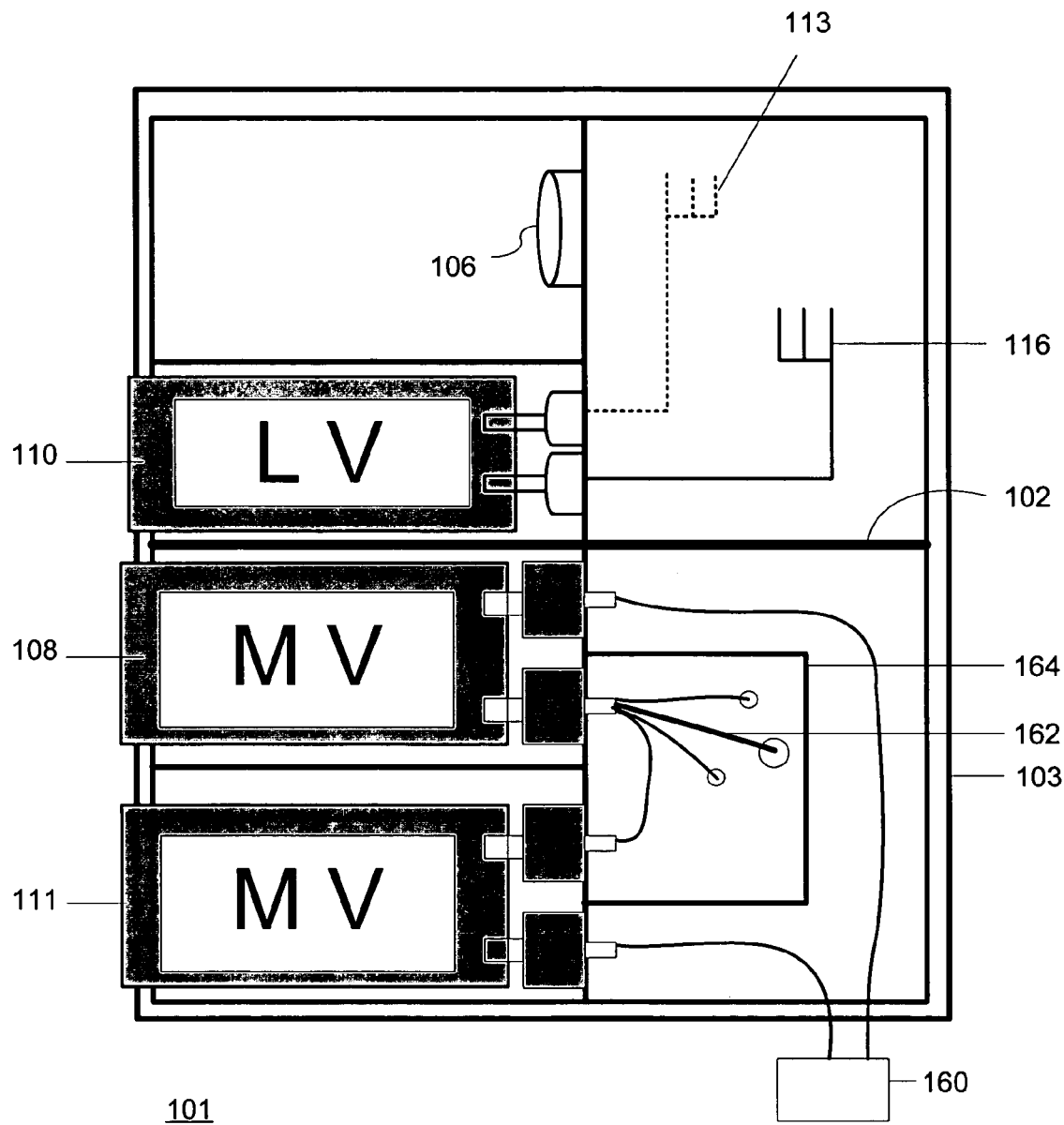
FIG. 1b illustrates a cut away side view of another embodiment of the improved unit substation.

FIG. 1b shows a cut away view of another embodiment of the improved unit substation 101. As shown in FIG. 1b, the improved substation 100 includes a single housing 103 that houses a plurality of main breaker cells. In this particular embodiment, a low voltage main breaker cell 110 is vertically positioned above (i.e., on top of) a plurality of medium voltage main breaker cells 108 and 111. Associated instrumentation and components, are optionally housed within an encasement that encloses the low voltage main breaker cell 110. A bus 113 (protruding into the page) connects the low voltage main breaker cell 110 to a secondary side of a substation transformer (not shown). Low voltage bus 116 (protruding out of the page) connects the low voltage main breaker cell 110 to distribution breakers.

Similarly, components may optionally be housed within the lower encasement that also houses the medium voltage main breaker cells 108 and 111. In one embodiment, an isolation barrier 164 provides electrical isolation between incoming and outgoing cables. In this embodiment, the medium voltage main breaker cells 108 and 111 are connected to a substation transformer primary windings (not shown), via a medium voltage power line 162. Power is provided to the improved substation via a utility provider 160. It will be appreciated by those skilled in the power distribution arts that another embodiment includes additional main breaker cells arranged in a vertical arrangement, having either low or medium voltage ratings. That is, in one embodiment, a medium voltage main breaker cell is vertically positioned above (i.e., on top of) a plurality of low or medium voltage main breaker cells.

Figure 1C:
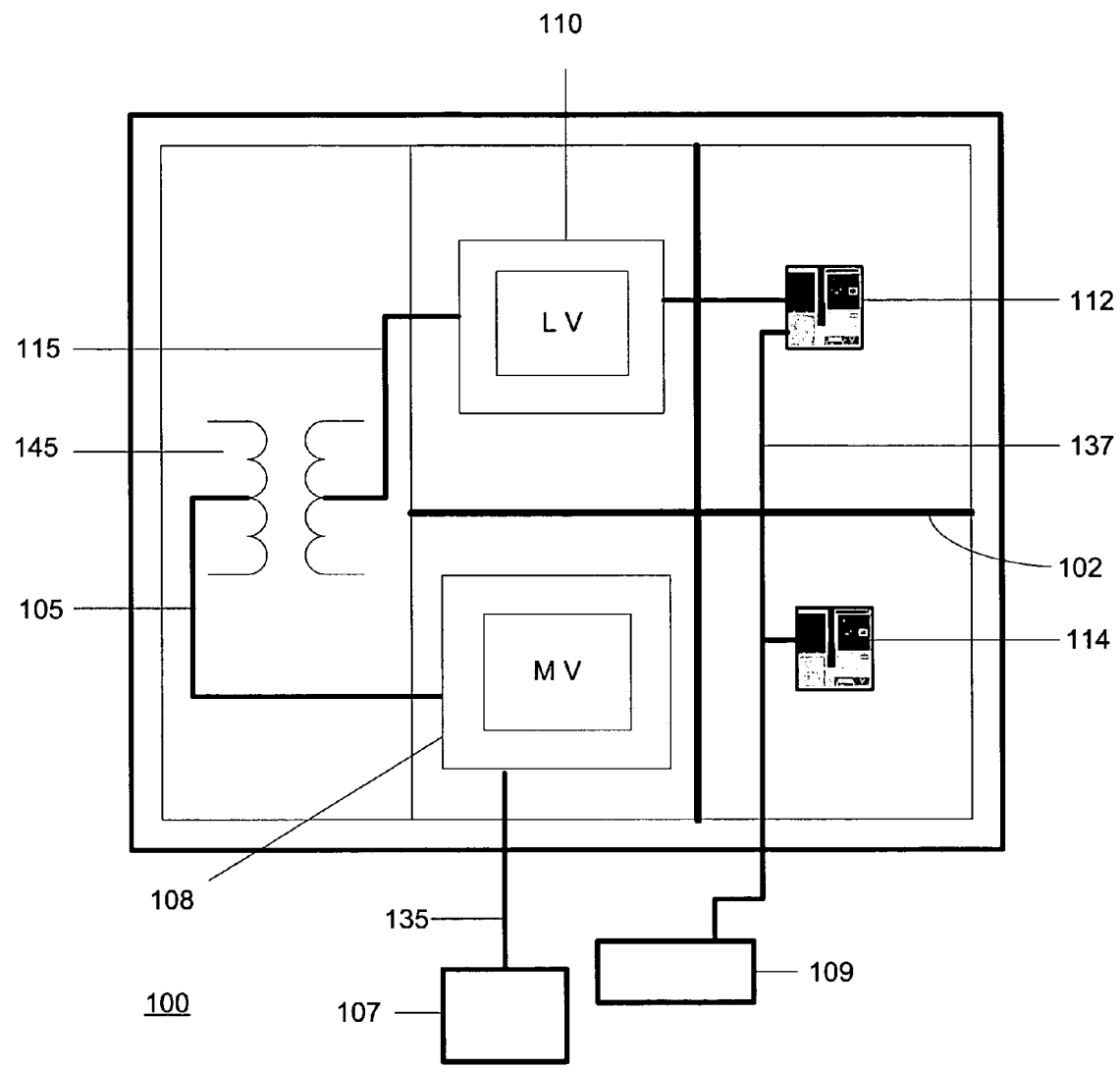
FIG. 1c illustrates a front view of the embodiment of FIG. 1a, including a substation transformer.

FIG. 1c illustrates a front view of an improved substation 100, corresponding to FIG. 1a. FIG. 1c shows an improved substation 100, having a substation transformer 145. A utility provider 107 provides power to the improved substation 100 via power cable 135. Medium voltage main breaker cell 108 is electrically connected to a primary winding side of the transformer 145, via a medium voltage power line 105. A low voltage main breaker cell 110 is electrically connected to a secondary winding side of the substation transformer 145, via a low voltage power cable 115. The low voltage main breaker cell 110 is electrically connected to other associated components and instruments 112 and 114. The associated components and instruments 112 and 114 provide power to a power distribution network 109, via distribution power cable 137.

Figure 1D:
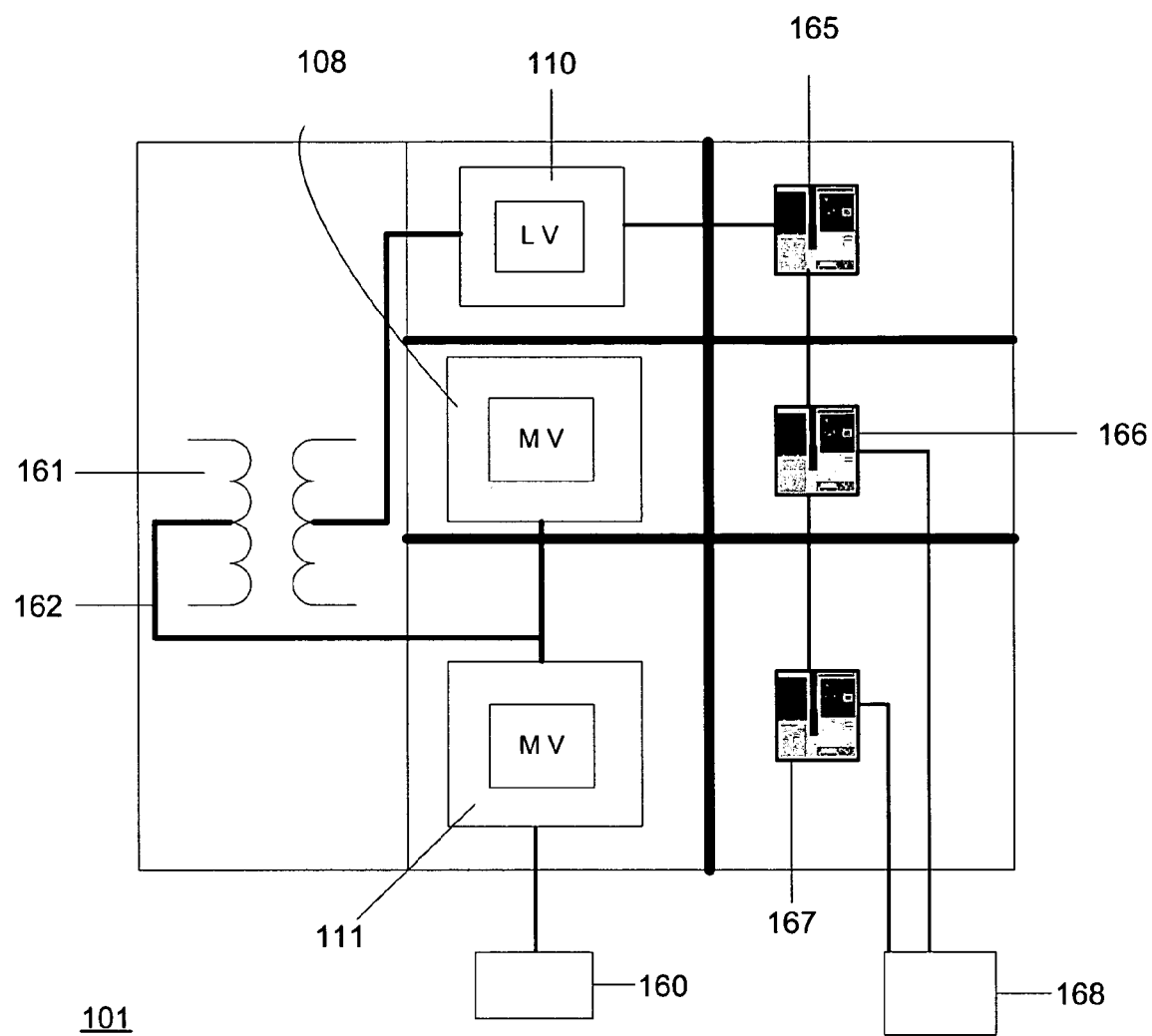
FIG. 1d illustrates a front view of the embodiment of FIG. 1b, including a substation transformer.

FIG. 1d illustrates a front view of an improved substation 101, corresponding to FIG. 1b. FIG. 1d shows an improved substation 101, having a substation transformer 161. A utility provider 160 provides power to the improved substation 101. A first medium voltage main breaker cell 111 is connected in parallel with a second medium voltage main breaker cell 108, to primary side windings of the substation transformer 161, via medium voltage power cable 162. Secondary side windings are connected to a low voltage main cell breaker 110. The low voltage main cell breaker 110 is connected to associated components and instruments 165, 166, and 167, which act to provide electricity to a power distribution network 168.

Figure 2A:
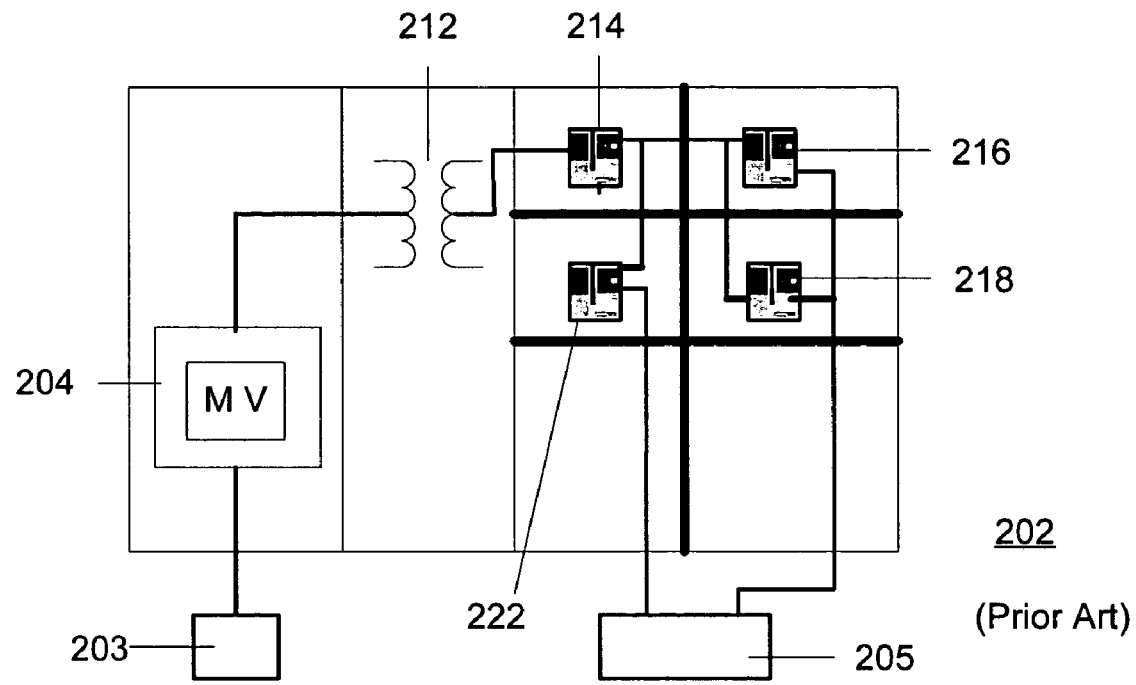
FIG. 2a illustrates a front view of a typical medium voltage single-ended power distribution substation.

As shown in FIG. 2a, a typical single-ended substation 202 includes a medium voltage main breaker cell 204 disposed horizontally (i.e, to the side of) with respect to a transformer 212 and other electrical components and instruments, such as, for example, power distribution breakers 214, 216, 218 and 222. One embodiment of the improved power distribution substation comprises a single-ended substation 208, shown in FIG. 2b. As illustrated, this embodiment includes a medium voltage main breaker cell 210 that is vertically disposed below main breaker cells 232, 234, and other associated components and instruments 230, 238. This embodiment provides considerable floor space savings as compared with the prior art substation 202 of FIG. 2a.

Figure 2B:
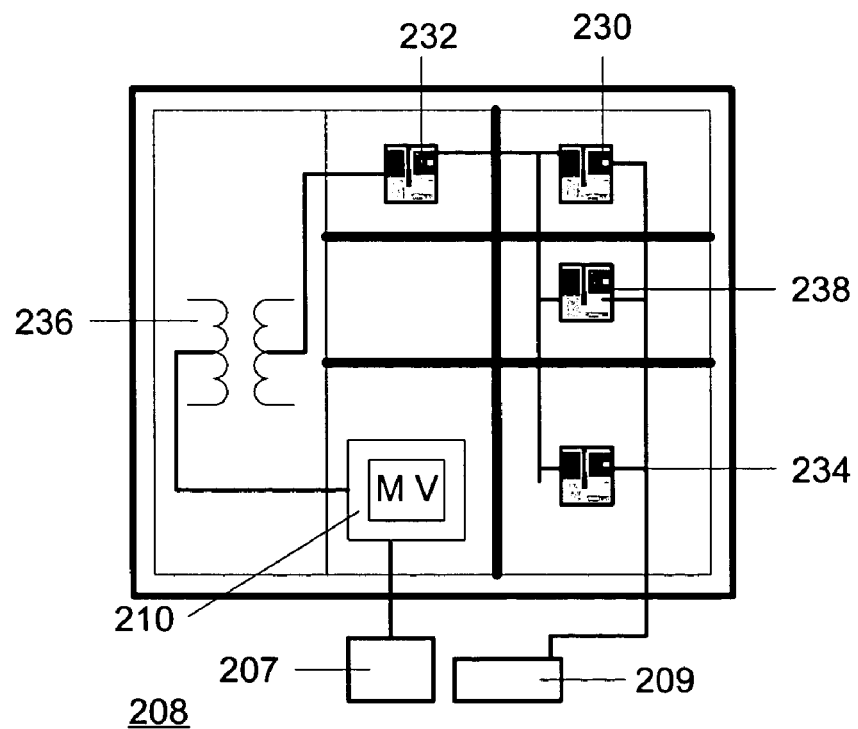
FIG. 2b illustrates a front view of an improved medium voltage single-ended unit substation.

The improved power distribution substation apparatus 208 of FIG. 2b provides considerable floor space savings over the prior art substation 202, because in the improved substation 208, the medium voltage main breaker cell 210 is disposed proximate to the secondary side of the transformer 236, and vertically stacked with respect to the other main breaker cells 232 and 234. In contrast, in the prior art substation 202, the medium voltage main breaker cell 204 is disposed proximate the primary side of the transformer 212, which requires a greater floor space footprint and consequently a larger substation as illustrated in FIG. 2a. Due to the improved power distribution substation apparatus 208 (of FIG. 2b) advantageous positioning of the medium voltage main breaker cell 210 on the secondary side of the transformer 236, if the transformer 236 requires replacement, or changes in size due to changed power requirements, the inventive substation 208 allows faster and easier substation repair and replacement. That is, if the transformer 236 requires changing due to a change in power requirements, or a change in industry standards, or it simply burns out, regardless of whether a new transformer has a different size, the improved substation apparatus 208 will readily accommodate such changes in dimension. However, when using the prior art substation 202 (of FIG. 2a), wherein the transformer 212 is disposed between medium voltage main breaker cell 204 and the other breaker cells 214 and 222, if a change in the dimension of a replacement transformer is required, not only will an entirely new substation need to be installed to accommodate such a change in transformer dimension, but the concrete pads beneath the substation 202 will also need to be rearranged. The conduit pathways providing incoming high voltage cables from a utility 203, and the outgoing cable pathways 205 must be replaced, creating increased costs and delays. Such a change in concrete conduit pathways requires destruction of a concrete pad (not shown) that lies under the substation. This, in turn, requires that a new concrete pad be poured.

The improved substation 208 advantageously positions the medium voltage main breaker cell 210 on the secondary side of transformer 236, while simultaneously preserving an electrical connection to the primary side of the transformer 236. However, if the dimensions or power ratings of the transformer 236 require change, the concrete channels that provide conduit pathways, both into and out from the substation 208, will not require changing. Due to the advantageous physical positioning of the medium voltage main breaker cell 210 on the secondary side of transformer 236, no changes to the concrete slab under the substation are required. Moreover, the transformer housing of the improved substation 208 can easily accommodate use of a larger or smaller replacement transformer, because the transformer 236 is positioned proximate one end of the substation 208.

Figure 3A:
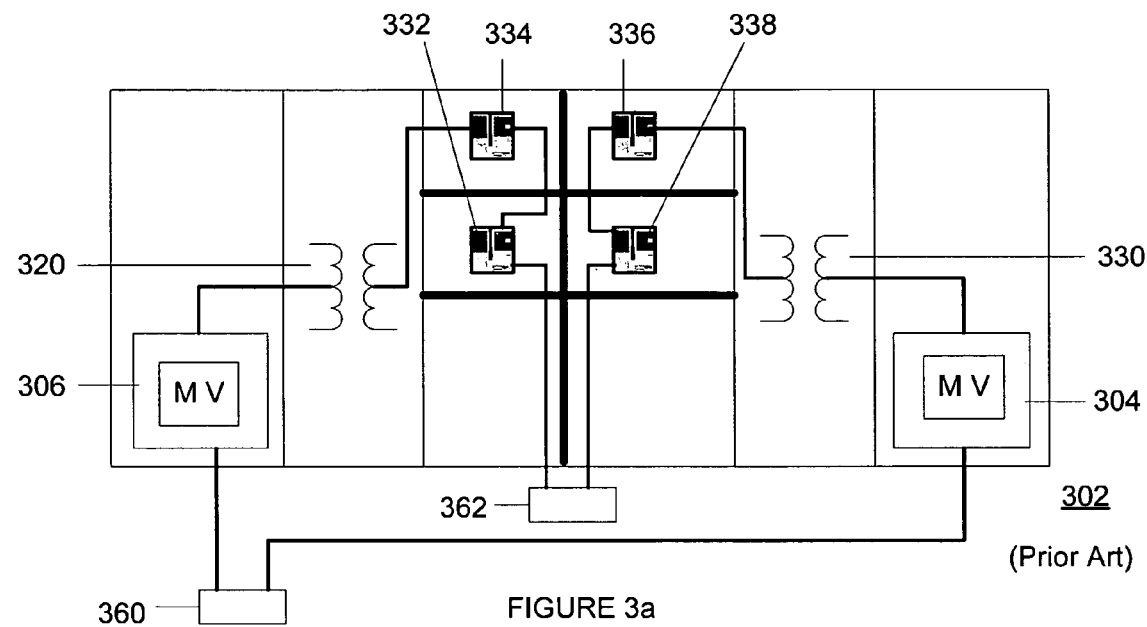
FIG. 3a illustrates a front view of a typical medium voltage double-ended unit substation.

As illustrated in FIG. 3a, a typical double-ended substation 302 houses first and second medium voltage main breaker cells 304, 306, respectively. In this arrangement, the cells 304, 306, are disposed near lateral ends of the double-ended substation 302. That is, the first medium voltage main breaker cell 304 is located proximate a first lateral end of the double-ended substation 302. The second medium voltage main breaker cell 306 is located proximate a second lateral end of the double-ended substation 302. Associated instruments and components, for example, components 332, 334, 336, 338, are typically distributed between transformers 320, 330. Power to the substation 302 is provided by a utility provider 360. The substation 302 provides power to a distribution network 362.

Figure 3B:
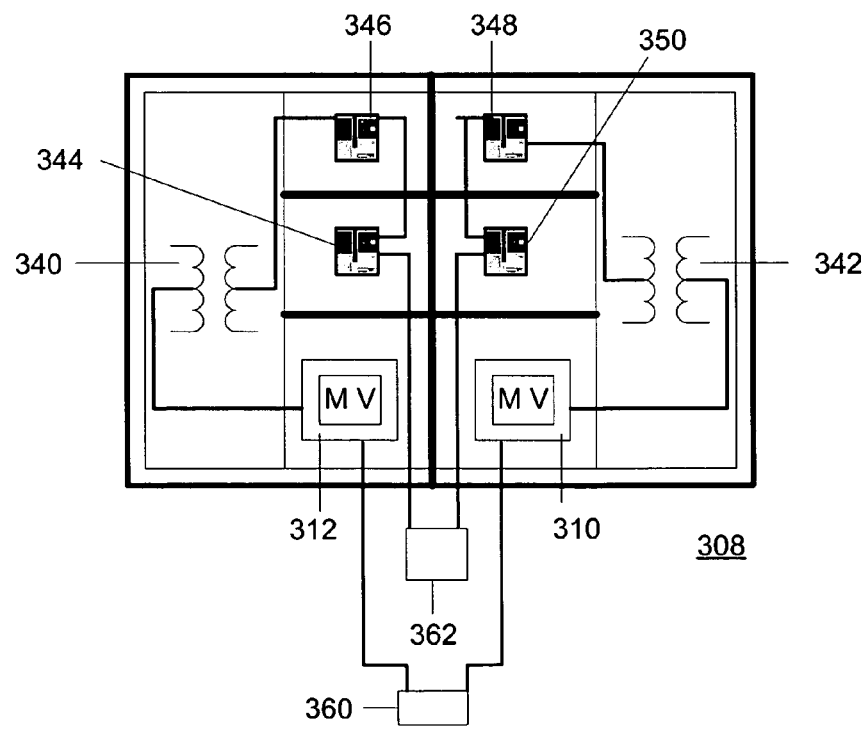
FIG. 3b illustrates a front view of an improved medium voltage double-ended unit substation.

One embodiment of an improved power distribution substation comprises an improved medium voltage double-ended substation 308 as shown in FIG. 3b. As shown in FIG. 3b, medium voltage main breaker cells 310 and 312 are located proximate to the center of the medium voltage double-ended substation 308. The medium voltage main breaker cells 310 and 312 are located nearer to the center of the substation 308 than are the first and second transformers 340, and 342, respectively. Additionally, in this embodiment, associated components 346 and 348, and other main breaker cells 344 and 350, are positioned vertically (i.e., on top of) with respect to the medium voltage main breaker cells 310 and 312. Considerable floor space is saved using this embodiment of a double-ended power distribution substation due to the arrangement and positioning of the main breaker cells 310, 312. Power to the improved substation 308 is provided by a utility provider 360. The improved substation 308 provides power to a distribution network 362.

The positioning of the medium voltage main breaker cells 310 and 312, in substation 308, provide similar advantages over the prior art substation 302, as the advantages provided by the improved substation 208 described above with reference to FIG. 2b. In the substation 302 of FIG. 3a, the medium voltage main breaker cells 304 and 306 are physically disposed proximate the primary side of the transformers 330 and 320, respectively. In contrast, the medium voltage main breaker cells 310 and 312 in the improved substation 308 of FIG. 3b are physically disposed proximate the secondary side of the transformers 340 and 342, respectively. Note however, that in the improved substation 308, the medium voltage main breakers 310 and 312 are still electrically coupled to the primary sides of the transformers 340 and 342, respectively. As described above, such a positioning of medium voltage main breaker cells 310 and 312 advantageously provides a substation apparatus, in which the transformers 340 and 342 can readily be replaced (if, for example, an industry transformer standard changes, the power ratings requirement increase, or a transformer burns out, etc.) if a replacement transformer requires different dimensions (e.g., the replacement transformer is smaller or larger). Advantageously, using the improved substation 308, the transformer can be replaced without requiring a completely new substation to accommodate such a change in transformer dimension, as required using the prior art substation 302. Moreover, if the prior art substation 302 requires a change in transformer 320 and/or 330, a concrete pad (not shown) that provides conduit pathways to the substation, must be demolished, and a new concrete pad, conforming to the new substation dimensions, must be poured. Hence, the improved substation 308 allows for variations and/or replacement of the transformers 340 and 342, with reduced costs and delays.

Figure 3C:
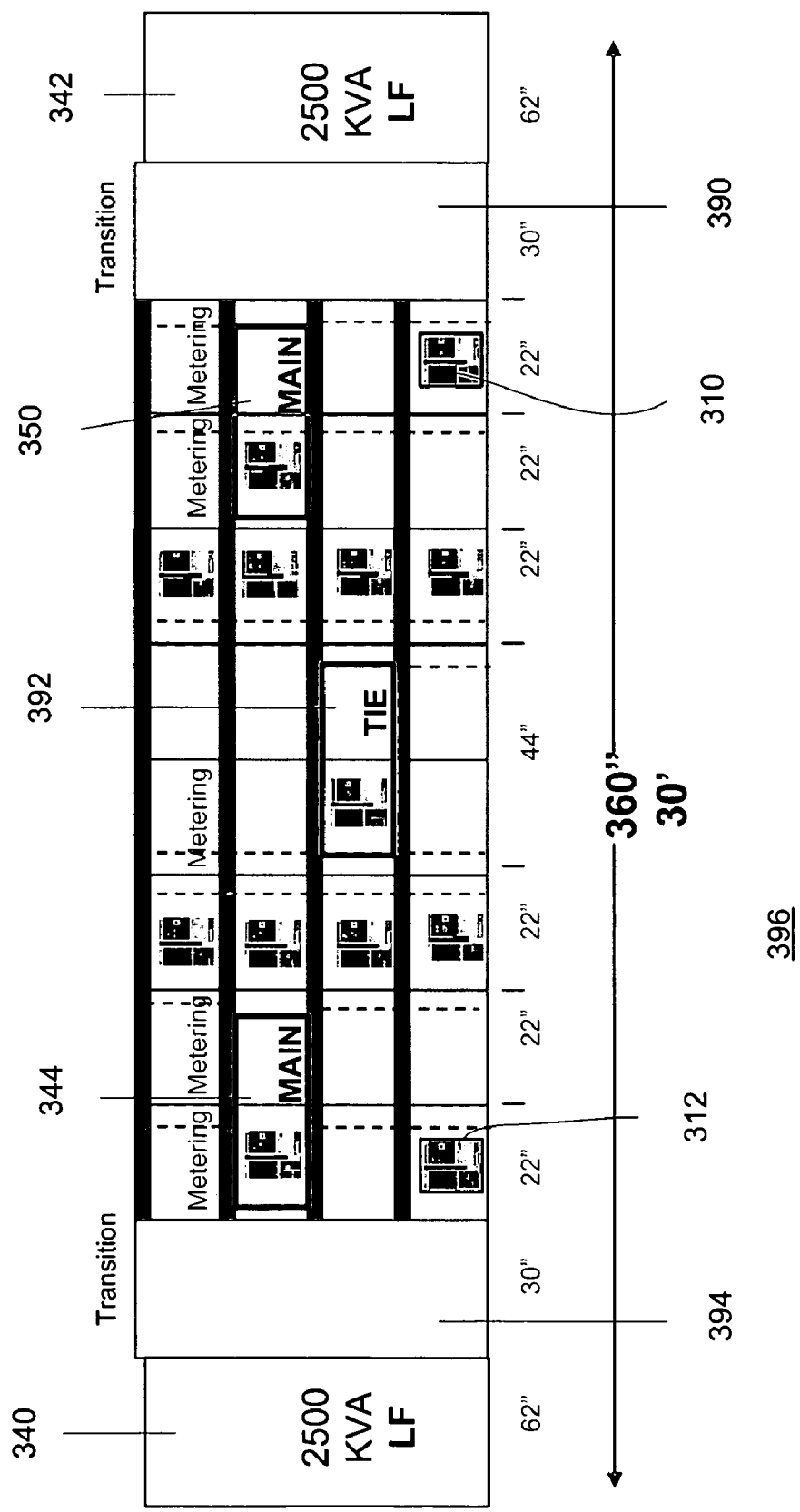
FIG. 3c illustrates a front view of one embodiment of an improved medium voltage double-ended unit substation, corresponding to FIG. 3b.

FIG. 3c illustrates one specific embodiment of an improved power distribution substation 396, corresponding to the improved power distribution substation 308 of FIG. 3b. In this embodiment, medium voltage main cell breakers 310 and 312 are positioned vertically below low voltage main cell breakers 344 and 350. The medium voltage main cell breakers 310 and 312 are coupled to primary side windings of transformers 342 and 340, respectively. The low voltage main cell breakers 344 and 350 are connected to secondary side windings of transformers 340 and 350, respectively, via associated instruments/components 346 and 348, respectively. Transitions 390 and 394 are an enclosure surrounding copper bus bars (not shown), wherein the copper bus bars connect the transformers 340 and 342 to other substation components. The size or need for these transitions is based upon the physical configuration of the transformer and switchgear electrical connections.

Figure 4A:
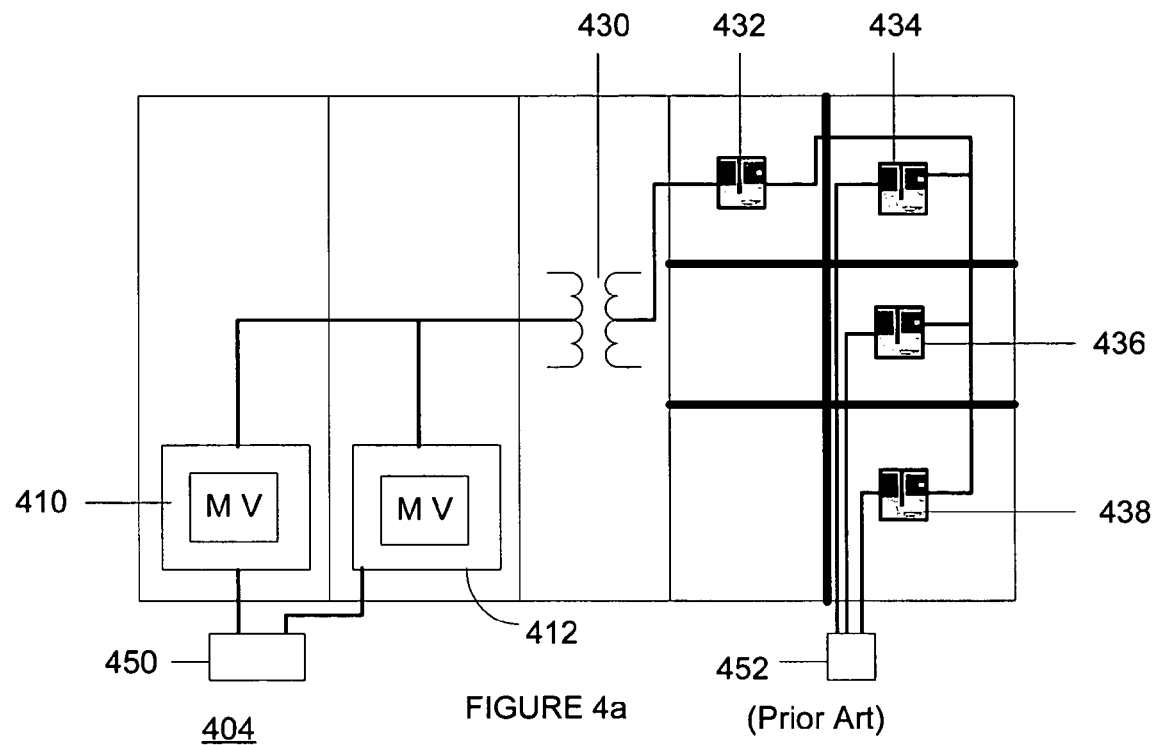
FIG. 4a illustrates a front view of a typical double-ended unit substation arranged in a duplex configuration.

FIG. 4a illustrates another typical substation 404 arranged in a duplex configuration, having medium voltage main breaker cells 410 and 412. As shown in FIG. 4a, a single transformer 430 couples in parallel to the medium voltage main breaker cells 410, 412. The medium voltage main breaker cells are electrically coupled to the primary winding of the transformer 430. Power is provided to the substation 404 via a utility provider 450. Additional components, such as distribution breaker cells 432, 434, 436, and 438, are also disposed within the substation 404. The substation 404 provides power to a distribution network 452.

Figure 4B:
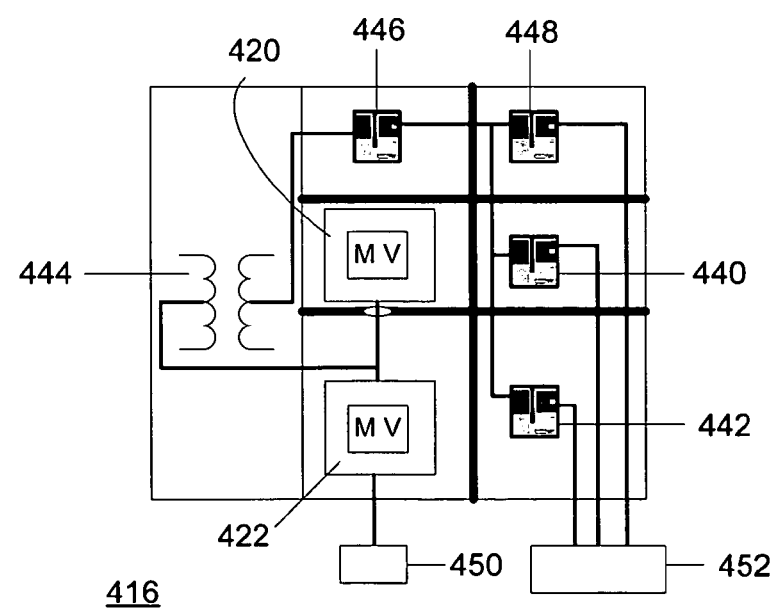
FIG. 4b illustrates a front view of an improved double-ended unit substation providing redundant power generation.

FIG. 4b illustrates one embodiment of an improved redundant power distribution substation 416, having first and second voltage main breaker cells, 420, 422, respectively. In the embodiment shown in FIG. 4b, the main breaker cells 420, 422 comprise medium-voltage main breaker cells. Power is provided to the substation 416 via a utility provider 450. In one embodiment, the medium-voltage main breaker cells 420, 422 are coupled in parallel to the primary winding transformer 444. Additional electrical components and instruments 440, 442, and 448, are disposed within the substation housing. The improved substation 416 provides power to a distribution network 452. An optional low voltage main breaker cell 446 may also be enclosed within the substation housing. One advantage of the duplex configuration and vertical stacking of the main voltage breaker cells 420, 422, is a reduction of floor space required by the substation 416. Also, as described above with reference to the improved substation 308 of FIG. 3b, the costs associated with cabling and concrete pads are also reduced. In this duplex configuration, if one main breaker cell or source fails or malfunctions, power to the customer is not lost as a second main breaker provides continued power to the transformer.

As described above with reference to FIGS. 2a, 2b and FIGS. 3a, 3b, the substation 416 of FIG. 4b provides several advantages over the prior art substation 404 of FIG. 4a. In the prior art substation 404, the medium voltage main breaker cells 410 and 412 are disposed proximate the primary winding side of the transformer 430, as shown in FIG. 4a. In contrast, in the improved substation 416, the medium voltage main breaker cells 420 and 422 are disposed proximate the secondary winding side of transformer 444. However, the medium voltage main breaker cells 420 and 422 are still electrically coupled to the primary winding side of transformer 444. Because the transformer 444 is physically located proximate one end of the substation 416, replacement or re-dimensioning of the transformer 444 is simplified as described above. Moreover, as described above with reference to the improved substation 318 of FIG. 3b, should the transformer 444 require replacement or re-dimensioning, the concrete pad that sits under the substation (and that provides cabling to the substation) does not need to be replaced. This greatly reduces the costs associated with substation maintenance and repair.

Each practical and novel combination of the elements and alternatives described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising."

What is claimed is:

1. An improved power distribution substation apparatus, for use in an electrical power distribution network, including a plurality of switchgear main breaker cells, comprising:

a) an upper encasement, enclosing a first voltage main breaker cell and associated instrument compartment, wherein the upper encasement encloses electrical components associated with the first voltage main breaker cell, and wherein the first voltage main breaker cell distributes a first voltage;

b) a lower encasement, vertically positioned below the upper encasement, wherein the lower encasement encloses a second voltage main breaker cell and associated instrument compartment, wherein the lower encasement encloses electrical components associated with the second voltage main breaker cell, and wherein the second voltage main breaker cell distributes a second voltage that differs from the first voltage;

c) a voltage transformer, coupled to the second voltage main breaker cell;

d) an isolating baffler positioned between the upper encasement and the lower encasement, and;

e) wherein the first and second voltages exceed 100 Volts, wherein the first voltage main breaker cell comprises a medium voltage main breaker cell coupling a medium voltage to the substation transfoimer, and wherein the second voltage main breaker cell comprises a low voltage main breaker cell distributing a low voltage, and wherein the medium voltage is greater than the low voltage.

2. The apparatus of claim 1, wherein the low voltage has a maximum value of approximately 600 volts or less.

3. The apparatus of claim 1, wherein the medium voltage has a minimum value of approximately 980 volts.

* * * * *